United States Patent [19]
Ryder et al.

[11] 3,923,785
[45] Dec. 2, 1975

[54] (R)-3-(2-DEOXY-β-D-ERYTHRO-PENTOFURANOSYL)-3,6,7,8-TETRAHYDROIMIDAZO[4,5-D][1,3]DIAZEPIN-8-OL

[75] Inventors: Albert Ryder; Henry W. Dion, both of Detroit; Peter W. Woo, Ann Arbor; John D. Howells, Grosse Pointe Woods, all of Mich.

[73] Assignee: Parke, Davis & Company, Detroit, Mich.

[22] Filed: Apr. 22, 1974

[21] Appl. No.: 462,826

[52] U.S. Cl............ 260/211.5 R; 195/80; 424/180
[51] Int. Cl.²......................................... C07H 19/16
[58] Field of Search ........................ 260/211.5 R

[56] References Cited
UNITED STATES PATENTS
3,703,507   11/1972   Haskell et al. ............... 260/211.5 R
3,792,036   2/1974    Pfleiderer..................... 260/211.5 R

*Primary Examiner*—Johnnie R. Brown

[57] ABSTRACT

Essentially pure (R)-3-(2-deoxy-β-D-erythro-pentofuranosyl)-3,6,7,8-tetrahydroimidazo[4,5-d][1,3]-diazepin-8-ol and the process for the production of (R)-3-(2-deoxy-β-D-erythro-pentofuranosyl)-3,6,7,8-tetrahydroimidazo[4,5-d][1,3]diazepin-8-ol by inoculating an aqueous nutrient medium, preferably containing sources of assimilable carbon and nitrogen and added inorganic salt and having a pH between about 6 and 8, with a (R)-3-(2-deoxy-β-D-erythro-pentofuranosyl)-3,6,7,8-tetrahydroimidazo[4,5-d][1,3]diazepin-8-ol producing strain of *Streptomyces antibioticus*, such as the strain corresponding to NRRL 3238, conducting a fermentation under aseptic aerobic conditions at a temperature between about 20 and 45°C. until a substantial quantity of (R)-3-(2-deoxy-β-D-erythro-pentofuranosyl)-3,6,7,8-tetrahydroimidazo-[4,5-d][1,3]diazepin-8-ol is formed, and isolating the desired product from the fermentation mixture are disclosed. The (R)-3-(2-deoxy-β-D-erythro-pentofuranosyl)-3,6,7,8-tetrahydroimidazo[4,5-d][1,3]diazepin-8-ol potentiates the activity of 9-(β-D-arabinofuranosyl)adenine as an antiviral agent that is active in vitro and in vivo against DNA viruses such as herpes and vaccinia viruses.

3 Claims, No Drawings

(R)-3-(2-DEOXY-β-D-ERYTHRO-PEN-TOFURANOSYL)-3,6,7,8-TETRAHY-DROIMIDAZO[4,5-D][1,3]DIAZEPIN-8-OL

SUMMARY AND DETAILED DESCRIPTION

The present invention relates to essentially pure (R)-3-(2-deoxy-β-D-erythro-pentofuranosyl)-3,6,7,8-tetrahydroimidazo[4,5-d][1,3]diazepin-8-ol, which is represented by the formula

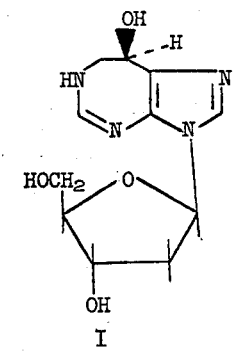

I and a process for the production of said compound. More particularly, the process relates to a fermentation process for the production of the compound of this invention by cultivating a selected (R)-3-(2-deoxy-β-D-erythro-pentofuranosyl)-3,6,7,8-tetrahydroimidazo[4,5-d][1,3]diazepin-8-ol producing strain of the organism *Streptomyces antibioticus*.

In addition, the invention relates to pharmaceutical compositions containing the compound of the invention in combination with 9-(β-D-arabinofuranosyl)adenine and methods for using said pharmaceutical compositions in the treatment of herpes infections.

In accordance with the invention, the compound of the invention (I) is produced by cultivating a selected (R)-3-(2-deoxy-β-D-erythro-pentofuranosyl)-3,6,7,8-tetrahydroimidazo[4,5-d][1,3]diazepin-8-ol producing strain of the organism *Streptomyces antibioticus* under artificial conditions in a suitable nutrient medium until a substantial quantity of (R)-3-(2-deoxy-β-D-erythro-pentofuranosyl)-3,6,7,8-tetrahydroimidazo[4,5-d][1,3]diazepin-8-ol is formed, removing 9-(β-D-arabinofuranosyl)-adenine and separating the compound of the invention. Following the period of cultivation or incubation, (R)-3-(2-deoxy-β-D-erythro-pentofuranosyl)-3,6,7,8-tetrahydroimidazo-[4,5-d][1,3]diazepin-8-ol can be obtained from the medium by procedures described hereinafter. The term "(R)-3-(2-deoxy-β-D-erythro-pentofuranosyl)-3,6,7,8-tetrahydroimidazo[4,5-d][1,3]diazepin-8-ol producing strain of the organism *Streptomyces antibioticus*," as used in the present specification and claims, means a strain of *Streptomyces antibioticus* which, when propagated under the articial conditions herein described, causes the formation of a beer from which (R)-3-(2-deoxy-β-D-erythro-pentofuranosyl)-3,6,7,8-tetrahydroimidazo[4,5-d]1,3]diazepin-8-ol can be obtained by the procedures set forth.

A strain of *Streptomyces antibioticus* suitable for the purpose of the invention has been isolated from a sample of soil collected near Bosco Trecase, Naples Province, Campania, Italy. Cultures of this organism have been deposited with the United States Department of Agriculture, Northern Utilization Research and Development Division, Peoria, Ill., and are being maintained in their permanent culture, collection as NRRL 3238.

The organism is an aerobic and aerially sporulating member of the order Actinomycetales and belongs in the genus Streptomyces as described in the Seventh Edition of Bergey's Manual of Determinative Bacteriology (1957). Its macroscopic cultural characteristics on numerous media useful for identification of members of this genus are shown in Table 1.

TABLE 1

MACROSCOPIC CULTURAL CHARACTERISTICS OF 9-(β-D-ARABINO-FURANOSYL)ADENINE-PRODUCING STRAIN OF *STREPTOMYCES ANTIBIOTICUS* CORRESPONDING TO NRRL 3238

| Culture Medium | Color of Aerial Mycelium | Color of Reverse of Substrate Mycelium | Soluble Pigment | Other Features |
|---|---|---|---|---|
| Yeast Extract-Malt Extract Agar | Grayish yellowish brown | Brownish gray | Moderate brown | Reddish with addition of NaOH* |
| Oatmeal Agar | Grayish yellowish brown | Lt. to moderate olive brown | Grayish to strong yellowish brown | Reddish with addition of NaOH* |
| Inorganic Salts-Starch Agar | Lt. to grayish yellowish brown | Lt. olive gray to moderate yellowish brown | Lt. to moderate yellowish brown | Reddish with addition of NaOH* |
| Glycerol-Asparagine Agar | Grayish yellowish brown | Grayish yellow | Grayish to strong yellowish brown | Reddish with addition of NaOH* |
| Starch Agar B | Lt. to grayish yellowish brown | Lt. brownish gray to lt. grayish yellowish brown | None | — |
| Organic Nitrate Broth | — | — | — | Nitrate not reduced to nitrite |
| Gelatin | — | — | Dark brown | Strong liquefaction |
| Milk | — | — | Dark brown | Strong hydrolysis |
| Tryptone-Yeast Extract Broth | — | — | Dark brown | — |
| Peptone-Yeast Extract-Iron Agar | — | — | Black | — |

TABLE 1-continued

MACROSCOPIC CULTURAL CHARACTERISTICS OF 9-(β-D-ARABINO-
FURANOSYL)ADENINE-PRODUCING STRAIN OF *STREPTOMYCES
ANTIBIOTICUS* CORRESPONDING TO NRRL 3238

| Culture Medium | Color of Aerial Mycelium | Color of Reverse of Substrate Mycelium | Soluble Pigment | Other Features |
|---|---|---|---|---|
| Tyrosine Agar | — | — | Dark brown | — |
| Yeast Extract-Malt Extract Agar | — | — | — | 28°C.—Good growth<br>37°C.—Good growth<br>45°C.—Good growth<br>50°C.—Good growth |

Lt. = Light
*Color of soluble pigment.

When the organism is cultivated on certain agar media, the aerial mycelium is usually light to grayish yellowish brown. Cultivation in these agar media leads to the formation of yellowish brown to moderate brown soluble pigment that becomes reddish when the media are treated with sodium hydroxide. In media containing complex nitrogen sources a dark brown or black soluble pigment is formed.

The spore chains are straight to flexous, occasionally looped or loosely spiralled. With age, the chains become very flexuous and irregular. The spores are smooth and elliptical to globose and may vary in size from 0.7–1.2 microns × 0.9–1.7 microns.

In carbon utilization tests, good to fair growth was obtained with the following single carbon sources: glucose, L-arabinose, D-xylose, i-inositol, D-mannitol, D-fructose, and rhamnose. Poor to fair growth was obtained with raffinose, and poor or no growth was obtained with sucrose and cellulose.

In micromorphology, color of aerial mycelium, and melanin production, the organism resembles *Streptomyces antibioticus*, and is therefore regarded as a member of this species. In comparative laboratory studies over organism is similar to the type culture of *S. antibioticus*, strain IMRU 3435. In certain respects, however, our organism is distinctly different from the IMRU 3435 strain, as shown in Table 2, and is therefore regarded as a new and distinct strain of *S. antibioticus*, the new strain being represented by culture number NRRL 3238.

TABLE 2

COMPARISON OF (R)-3-(2-DEOXY-β-D-ERYTHRO-PENTOFURANOSYL)-
-3,6,7,8-TETRAHYDROIMIDAZO[4,5-d][1,3]DIAZERIN-8-OL
ADENINE-PRODUCING STRAIN OF *STREPTOMYCES ANTIBIOTICUS*
CORRESPONDING TO NRRL 3238 WITH *S. ANTIBIOTICUS*
CORRESPONDING TO IMRU 3435

| Characteristic | *S. antibioticus* Corresponding to NRRL 3238 | *S. antibioticus* Corresponding to IMRU 3435 |
|---|---|---|
| Color of Aerial Mycelium* | Light to grayish yellowish brown | Medium gray to light brownish gray |
| Micromorphology of Aerial Mycelium* | Occasional loops and spirals | No loops or spirals observed |
| Soluble Pigment | | |
| Yeast Extract-Malt Extract Agar | Moderate brown | Grayish yellow |
| Oatmeal Agar | Grayish to strong yellowish brown | Grayish yellow |
| Inorganic salts-Starch Agar | Light to moderate yellowish brown | None |
| Glycerol-Asparagine Agar | Grayish to strong yellowish brown | None |
| Effect of NaOH on Soluble Pigment of Above Media | Pigment becomes reddish | Pigment unchanged |
| Tyrosine Agar | Dark brown | None |
| Carbon Utilization | | |
| Sucrose | Poor | None |
| Xylose | Good | Fair |
| i-Inositol | Fair | Good |
| L-Rhamnose | Fair | Good |
| Raffinose | Poor to fair | None |
| Nitrate Reduction to Nitrite | Negative | Positive |
| Gelatin Liquefaction | Strong | Weak |
| Milk Hydrolysis | Strong | Weak |
| Growth on Yeast Extract-Malt Extract Agar at 45°C. and at 50°C. | Positive | Negative |

*Table 1, in first five media.

In accordance with the invention, (R)-3-(2-deoxy-β-D-erythro-pentofuranosyl)-3,6,7,8-tetrahydroimidazo-[4,5-d][1,3]diazepin-8-ol is produced by inoculating an aqueous nutrient medium with a (R)-3-(2-deoxy-β-D-erythro-pentofuranosyl)-b 3,6,7,8-tetrahydroimidazo[4,5-d][1,3]-diazepin-8-ol producing strain of *Streptomyces antibioticus*, conducting a fermentation under aseptic aerobic conditions at a temperature between about 20° and 45°C. until a substantial quantity of (R)-3-(2-deoxy-β-D-erythro-pentofuranosyl)-3,6,7,8-tetrahydroimidazo[4,5-d][1,3]diazepin-8-ol is formed in the fermentation mixture, and subjecting the fermentation mixture to subsequent treatment in order to obtain the desired product.

For the inoculation, spores or conidia of the selected culture of Streptomyces antibioticus can be used. Aqueous suspensions of the spores or conidia containing a small amount of soap or another wetting agent can be conveniently employed. For large fermentation it is preferable to use vigorous young aerated and agitated broth cultures of the microorganism.

Suitable aqueous nutrient media are those containing assimilable sources of carbon and nitrogen and preferably having a pH between about 6 and 8. Sources of carbon which are assimilable and satisfactory for use include pure carbohydrates that can be utilized by the organism as well as commercially-available carbohydrate mixtures. Some examples of the materials that are suitable for this purpose are various sugars, such as glucose, maltose, lactose, and mannose; starch and modified starches; corn syrup; malt liquors; blackstrap molasses; glycerol; and corn meal. The quantity of the carbohydrate present in the nutrient medium is not particularly critical and can vary from about 0.5 to 5 percent by weight of the medium. Quantities somewhat outside of this range can also be used.

The sources of nitrogen in the nutrient medium can be of an organic, inorganic, or mixed organic-inorganic nature. Some examples of the many nitrogenous substances that can be employed in the nutrient medium are amino acids, peptones, hydrolyzed and unhydrolyzed proteins, fish meal, soybean meal, peanut meal, cottonseed meal, wheat gluten, corn steep liquor, dehydrated corn steep liquor, meat extracts, inorganic nitrates, urea, and ammonium salts. Because of the crude nature of most of the readily-available nitrogen sources, the quantity to be added to the medium varies according to the purity, and it is not readily possible to specify a definite quantity of nitrogenous source material that should be added to the medium. It can be said, however, that, for practical purposes, nitrogenous materials need not exceed 6% by weight of the total fermentation medium and can be present in a considerably lower amount.

The presence of a certain amount of mineral salts and traces of growth factors of unknown composition is desirable in order to obtain the best yields of (R)-3-(2-deoxy-β-D-erythro-pentofuranosyl)-3,6,7,8-tetrahydroimidazo[4,5-d][1,3]diazepin-8-ol. Many readily-available crude materials, such as corn steep liquor, yeast preparations, soybean oil meal, molasses fermentation residues, and other products of like character contain such inorganic salts and growth factors, and the inclusion of one or more of these materials in the fermentation medium is desirable. In order to ensure the presence of adequate amounts of the mineral components of the medium, it is also advantageous in many cases to add some inorganic salts, such as sodium chloride, sodium bicarbonate, potassium phosphate, sodium acetate, calcium carbonate, and magnesium sulfate, as well as trace quantities of minerals such as copper, cobalt, manganese, zinc, and iron. The preferred concentration of a given mineral salt is between 0.1 and 1 percent by weight of the nutrient medium.

The cultivation of the selected strain of Streptomyces antibioticus in the aqueous nutrient medium can be carried out in a number of different ways. For example, the organism can be cultivated under aerobic conditions on the surface of the medium; or it can be cultivated beneath the surface of the medium, that is, in the submerged condition, provided that an adequate supply of oxygen is furnished.

The preferred method for producing (R)-3-(2-deoxy-β-D-erythro-pentofuranosyl)-3,6,7,8-tetrahydroimidazo[4,5-d][1,3]diazepin-8-ol on a large scale is by the fermentation of a (R)-3-(2-deoxy-β-D-erythro-pentofuranosyl)-3,6,7,8-tetrahydroimidazo[4,5-d][1,3]diazepin-8-ol producing strain of Streptomyces antibioticus in a submerged or deep culture. According to this embodiment of the invention, a sterile aqueous nutrient medium is inoculated with the selected culture and incubated with agitation and aeration under aseptic conditions at a temperature between about 20° and 45°C., preferably in the neighborhood of 33°–40°C., until a substantial quanity of (R)-3-(2-deoxy-β-D-erythro-pentofuranosyl)-3,6,7,8-tetrahydroimidazo[4,5-d]-[1,3]diazepin-8-ol is found in the culture liquid. The length of time required for the maximum yield varies with the size and type of equipment used, the rates of agitation and aeration, the specific organism culture and other factors. In large scale commercial fermentations carried out in the tank-type fermentors, maximum production is usually reached in about 3 to 7 days. Shorter fermentation periods can also be used, but usually produce a lower yield. When the fermentation is carried out in shaken flasks, the time required for maximum production may be somewhat longer than when large fermentation tanks are used.

Under the submerged culture conditions, the microorganism develops as relatively discrete particles dispersed throughout the nutrient medium in contrast to the relatively continuous pellicle present on the surface of the medium in the surface culture method. By virtue of this distribution of the organism throughout the medium, large volumes of the inoculated nutrient medium can be used in the cultivation of the organism in the tanks and vats customarily employed in the fermentation industry. Stationary vat fermentors equipped with agitation and aeration devices are particularly suitable for large-scale production, although fermentation equipment of other designs can also be used. For the production of smaller quantities of product or for the preparation of cultures of the organism to be used as inoculum for largescale fermentations, the submerged culture method can be carried out in small flasks or jars which are either shaken or stirred by suitable mechanical means.

In the submerged culture method, agitation and aeration of the culture mixture can be accomplished in a number of ways. Agitation can be provided by turbines, paddles, impellers or other mechanical agitation devices, by revolving or shaking the fermentor itself, by various pumping devices or by the passage of air or oxygen through the medium. Aeration can be brought about by injecting air or oxygen into the fermentation mixture through open pipes, perforated pipes, or pipes containing a porous diffusion section; or it can be brought about by spraying, splashing or spilling the medium into or through an oxygen-containing atmosphere.

An alternative to the preferred submerged culture method is the surface culture method of producing (R)-3-(2-deoxy-β-D-erythro-pentofuranosyl)-3,6,7,8-tetrahydroimidazo[4,5-d][1,3]diazepin-8-ol according to which a shallow layer, usually less than 2 cm., of a sterile, aqueous nutrient medium is inoculated with a (R)-3-(2-deoxy-β-D-erythro-pentofuranosyl)-3,6,7,8-tetrahydroimidazo[4,5-d][1,3]diazepin-8-ol producing strain of *Streptomyces antibioticus* and the inoculated mixture is incubated under aerobic conditions at a temperature between about 20° and 45°C. The product is then obtained in a manner similar to that described for the submerged culture method.

Upon completion of the fermentation phase of the process, the desired product can be obtained in the following manner. The mycelium is separated by such means as filtration or centrifugation. The filter cake is washed well with water, the washings are combined with the filtered beer, the pH is adjusted to about 9.2 using an aqueous solution of a base such as sodium hydroxide, triethylamine or ammonium hydroxide, and the combined liquids are concentrated under reduced pressure to about one-tenth the original volume. The concentrated solution is cooled at about 5°C. for an extended period (from several hours to several days, depending on the volume), and the solid that precipitates, which is 9-(β-D-arabinofuranosyl)adenine, as disclosed in U.S. Pat. No. 3,616,208 is removed by filtration with the aid of diatomaceous earth.

Novelly, the resulting filtrate is then diluted with water up to about its original volume before concentration. The pH is adjusted to about 8.3 using an aqueous acid such as hydrochloric or sulfuric, and treated with activated charcoal or other adsorbing agent, preferably Darco G-60. The adsorption can be carried out either in batches or by continuous flow through an adsorption column. In the preferred batch method, from 0.5 to 10.0 percent, preferably about 3 percent weight-/volume of the preferred charcoal adsorbent is added to the filtered beer, and the resulting mixture is stirred for 1–3 hours. The mixture is filtered, the solid material is washed with water followed by eluting with aqueous acetone (about equal parts water and acetone). The eluate is concentrated so as to be about one three hundredth of the volume of the original amount of beer. Methanol is added to the concentrate so as to obtain an 80 percent aqueous methanol solution. The resulting precipitate is removed by filtration. The filtrate is concentrated to remove the methanol and the concentrate is then diluted to about two and one-half times its orginal volume by the addition of an aqueous acetone solution (about 5 percent acetone in water) and passed through a charcoal column whose length and width vary with the volumes used. The charcoal column is washed with an acetone solution containing about 95% water and 5% acetone followed by a solution containing about 90% water and 10% acetone. The column is next eluted with an acetone solution containing about 75% water and 25% acetone. The eluate is concentrated in vacuo and freezedried. The dried solid is dissolved in a minimum amount of water and then percolated through a packed column of Sephadex G-10 prepared in water. The column is washed with water and those cuts containing the desired product are dried and crystallized from aqueous methanol.

The essentially pure (R)-3-(2-deoxy-β-D-erythro-pentofuranosyl)-3,6,7,8-tetrahydroimidazo[4,5-d][1,3]diazepin-8-ol has the following properties:

1. m.p. 220°–225°C uncor. 2. U.V. in water λ 282 $E_1^1$ 298
pH 2 λ 273 $E_1^1$ 282
pH 2 after 6.5 hrs. λ 267 $E_1^1$ 117
pH 11 λ 283 $E_1^1$ 297
3. $[\alpha]_D^{25}$ + 76.4° 1% in water
4. Thin layer chromatography Brinkmann silica gel $F_{254}$
   a. 50% methanol — 50% chloroform $R_f$ 0.42
   b. 80% methanol — 20% chloroform $R_f$ 0.54
5. $pK'a$ 5.2 in water; estimated mol. wt. 300
6. Infrared spectrum (KBr disc).

Broad intense band in the 3,400 – 2,500 $cm^{-1}$ region with max. at 3,400, 3,120, 2,940, 2,890 $cm^{-1}$; the remainder of the spectrum exhibits sharp maxima — the more prominent ones being 1,649, 1,578, 1,544, 1,505, 1,470, 1,460, 1,414, 1,396, 1,370, 1,356, 1,325, 1,301, 1,281, 1,245, 1,214, 1,178, 1,162, 1,135, 1,115, 1,095, 1,060, 1,035, 1,020, 990, 952, 868, 842, 822, 765, 745, 702, 668, 580, 540, 510, 475 $cm^{-1}$.

7. Nuclear magnetic resonance in $D_2O$ using Tetramethylsilane (TMS) as the external standard.

Multiplet at 2.65, 2.81, 2.87, 2.98, 3.10 ppm; sharp bands at 3.79, 3.82, 3.89, 4.13, 4.19 ppm; quadruplet at 4.43, 4.49, 4.56, 4.62 ppm; multiplet at 4.87, 4.93, 4.96, 4.98, 5.02, 5.09 ppm; HDO at 5.16 ppm; quadruplet at 5.51, 5.54, 5.57, 5.60 ppm; triplet 6.55, 6.67, and 6.79 ppm; singlets at 7.62 and 8.11 ppm.

The compound of this invention is a potent deaminase inhibitor (Example 1, part A). In addition, the compound of this invention potentiates the activity of 9-(β-D-arabinofuranosyl)adenine, an antiviral agent U.S. Pat. No. 3,616,208 which is incorporated by reference) useful in the treatment of infections caused by DNA viruses, especially herpes and vaccinia virus infections in mammals. More specifically, the compound of this invention, when administered in combination with 9-(β-D-arabinofuranosyl)adenine in ratios of from about 0.005 to 0.2 parts of the compound of this invention to 1 part of 9-(β-D-arabinofuranosyl)adenine gives rise to a pharmaceutical composition which is more active than compositions containing only 9-(β-D-arabinofuranosyl)adenine as an antiviral agent against DNA viruses. The preferred range is from 0.01 to 0.05 parts of the compound of this invention to 1 part of 9-(β-D-arabinofuranosyl)adenine. More specifically, when the composition is administered parenterally, preferably intravenously, injectable solutions are given so as to provide the host with from .1 mg. to 5 mg. of 9-(β-D-arabinofuranosyl)adenine per kg. of body weight and 0.0005 mg. to 1 mg. of the compound of this invention per kg. of body weight per day. The preferred quantity which is administered on a daily basis is from about 0.5 mg. to 2 mg. of 9-(β-D-arabinofuranosyl)adenine per kg. of body weight to about .005 mg. to .002 mg. of the compound of this invention per kg. of body weight.

The pharmaceutical composition may be in bulk form containing 0.005 to 0.2 parts of the compound of this invention to about 1 part of 9-(β-D-arabinofuranosyl)-adenine which is placed in solution at time of use by the addition of a solvent which is appropriate for injectables. In the alternative, the pharmaceutical composition may be an aqueous solution containing a ratio of from 0.005 to 0.2 parts of the compound of this invention to about 1 part of 9-(β-D-arabinofuranosyl)adenine and other materials such as preservatives, buffering agents, agents intended to adjust the isotonicity of the solution, etc. The volume of water is not critical and may vary from less than 1 ml.

to about 500 ml.

In addition, the above combination may be employed in ophthalmic compositions, such as ointments and solutions, in the treatment of herpes keratitis. Thus ointments or solutions containing about 0.001 to 0.05 percent, preferably 0.001 to 0.005 percent of the compound of this invention and 0.1 to 0.5 percent of 9-($\beta$-D-arabinofuranosyl)-adenine in a suitable pharmaceutical carrier may be employed. In addition, preservatives, agents intended to adjust isotonicity of the solution, buffers, etc., may be incorporated into the pharmaceutical carriers.

Lastly, the above combination may also be employed in topical ointments and creams. The ointment or cream should contain about 0.001 to 0.05 percent, preferably 0.001 to 0.005 percent of the compound of this invention and 0.1 to 0.5 percent of 9-($\beta$-D-arabinofuranosyl)adenine in a suitable pharmaceutical carrier which may optionally contain preservatives, coloring agents, etc.

The invention is further illustrated by the following examples.

The production of (R)-3-(2-deoxy-$\beta$-D-erythro-pentofuranosyl)-3,6,7,8-tetrahydroimidazo[4,5-d][1,3]diazepin-8-ol by fermentation may be carried out in a 2000 gallon fermentor. The process is a standard submerged fermentation of an aerobic actinomycete.

Sporulated slant cultures (Stage I) are used to inoculate the seed medium which in this process is identical to the production medium. The organism is allowed to germinate and grow in 10 gallons of aerated, nonagitated medium for 40 hours (Stage II). This growing seed is then used to inoculate an intermediate agitated and aerated seed fermentor of a 300 gallon volume (Stage III). The intermediate seed (Stage III) is grown for about 24 hours and is then used to inoculate the 2,000-gallon production tank (Stage IV) containing 1,200 gallons of media.

Fermentations are allowed to proceed for about 5 days with constant aeration and agitation. The fermentations are sampled periodically for measurement of growth, pH and biochemical changes.

TABLE I

FERMENTATION CONDITIONS

| | Stage II (Seed) | Stage III (Seed) | Stage IV (Seed) |
|---|---|---|---|
| Vessel Size | 30 Gal. | 500 Gal. | 2000 Gal. |
| Volume Medium | 10 Gal. | 300 Gal. | 1200 Gal. |
| Inoculum Volume | 4 slants | 10 Gal. | 150 Gal. |
| Agitation | None | 84 RPM | 125 RPM |
| No. Impellors | None | 2 | 2 |
| No. Blades/Impellor | None | 6 | 3 – 5 |
| Aeration: CFM | 6.25 | 45 | 120 |
| Superficial Air Velocity | 2.8 | 2.8 | 2.8 |
| Temperature | 30°C | 30°C | 37°C |
| Internal Pressure | 10 psi | 10 psi | 10 psi |
| Sterilization Time at 250°F | 60 min. | 30 min. | 30 min. |
| Fermentation Time | 40 hours | 24 hours | 120 hours |
| Medium No. | ARM 1547 | ARM 1547 | ARM 1547 |
| Antifoam Type | Swifts 51 | Swifts 51 | Swifts 51 |

EXAMPLE 1

Inoculum for the fermentation is prepared by suspending a lyophilized stock of the culture NRRL 3238 in sterile distilled water and spreading this culture suspension over the surface of slants of a suitable agar medium. The resulting slants are incubated at a temperature of from about 25° to 32° (50° maximum). The organism grows and produces aerial spores in about 3 to 10 days. These sporulated cultures are used as inoculum immediately or stored at 3° to 10°C for several months prior to use.

TABLE II

| MEDIUM ARM 1547 | |
|---|---|
| Constituents (tradenames) | % (Weight) |
| Glucose monohydrate (Corn Products Cerelose) | 2.0 |
| Soybean meal, solvent extracted, 44% | 2.0 |
| NaCl | 0.5 |
| CaCO$_3$ | 0.25 |
| Swifts No. 51 defoamer (Swift and Co., Chicago, Ill.) | 0.04 |
| pH adjusted to 7.5 with NaOH before sterilization | |

TABLE III

ASSAYS RUN ON EACH STAGE

| Hr. | STAGE II (SEED) pH | STAGE II (SEED) Sediment | STAGE III (SEED) pH | STAGE III (SEED) Sediment | STAGE IV (FERMENTOR PP 902) pH | STAGE IV (FERMENTOR PP 902) Sediment | STAGE IV (FERMENTOR PP 903) pH | STAGE IV (FERMENTOR PP 903) Sediment |
|---|---|---|---|---|---|---|---|---|
| 0 | 6.85 | 6.7% | 6.9 | 7.4% | 6.6 | 7.4% | 6.6 | 7.4% |
| 8 | — | — | 6.7 | 8.7% | 6.55 | 13.3% | 6.4 | 17.3% |
| 12 | 7.05 | 6.7% | — | — | — | — | — | — |
| 16 | — | — | 6.55 | 15.3% | 6.25 | 17.3 | 5.9 | 17.3 |
| 24 | 6.20 | 12.7% | 6.4 | 19.3% | 6.35 | 20.0 | 6.4 | 19.3 |
| 32 | 6.65 | 21.3% | — | — | 6.4 | 20 | 6.45 | 20.0 |
| 40 | 6.60 | 23 % | — | — | 6.35 | 23.3 | 6.35 | 23.3 |
| 48 | | | | | 6.45 | 23.3 | 6.45 | 24 |
| 56 | | | | | 6.45 | 23.3 | 6.45 | 24 |
| 64 | | | | | 6.35 | 26.6 | 6.45 | 26.6 |
| 72 | | | | | 6.4 | 26.6 | 6.45 | 26 |
| 80 | | | | | 6.4 | 29.3 | 6.45 | 26.6 |
| 88 | | | | | 6.35 | 28 | 6.4 | 28.6 |

TABLE III-continued

| | ASSAYS RUN ON EACH STAGE | | | | | | | |
|---|---|---|---|---|---|---|---|---|
| | STAGE II (SEED) | | STAGE III (SEED) | | STAGE IV (FERMENTOR PP 902) | | STAGE IV (FERMENTOR PP 903) | |
| Hr. | pH | Sediment | pH | Sediment | pH | Sediment | pH | Sediment |
| 96 | | | | | 6.4 | 28.6 | 6.3 | 28 |
| 104 | | | | | 6.4 | 23.3 | 6.4 | 30.6 |
| 113 | | | | | 6.55 | 28.6 | 6.45 | 30.6 |
| 120 | | | | | 6.4 | 30 | 6.5 | 31.3 |

The harvested beer (2,515 gallons) is treated with 100 lbs. Celite 545 and filtered through the 36 in. plate and frame press. The pH is adjusted from pH 6.7 to 9.2, the beer is concentrated in vacuo to 250 gallons, and the concentrate is chilled at 4°–5°C for 3 days. Celite No. 545 (40 lbs.) is added to the chilled mixture and the slurry is filtered through the 18 inch plate and frame filter press. The filtrate is rediluted to 2,500 gallons with water and the diluted solution, adjusted to pH 8.3, is treated with 3% w/v (ca. 600 lbs.) of Darco G-60, an activated carbon produced from lignite and charcoal, (Atlas Chemical Industries, Wilmington, Del.) and 200 lbs. of Celite 545. The slurry is mixed fro ca. 1 hour at R.T. and then filtered through the 30 inch plate and frame filter press. The filter cake is washed with 750 gallons of water and then eluted four times with 500 gallon portions of 25% aqueous acetone. The first three 500-gallon eluates are combined (pH 7.4) and concentrated in vacuo to 32 liters (pH 8). The latter concentrate is diluted with 32 gallons of methanol to give an 80% aqueous methanol solution. The precipitate which formed on standing (2 hr.) is filtered off and discarded. The filtrate is then concentrated in vacuo to 24 liters. Total solids in solution is about 13.9 kg.

A. Laboratory Purification

A 700 ml. aliquot of the above 24 liters is diluted with 960 ml. of water and 87.5 ml. of acetone to give a 5% aqueous acetone solution. The solution is used as feed for a 6 in. x 4 ft. carbon column which is prepared as follows: 3500 g. of Darco G-60 and 3500 g. of Celite No. 545 are slurried in 5% aqueous acetone solution. The slurry is adjusted to pH 8.5 with dilute sodium hydroxide and packed into the 6 inches × 6 feet glass column. The packed column is about 48 inches in height. After the charge (1945 ml.) has percolated through the column, 19 liters of 5% aqueous acetone and 19 liters of 10% aqueous acetone are used as successive column washes. The desired deaminase inhibitor is eluted with 40 liters of 25% aqueous acetone. After the first 9 liters of 25% acetone eluate, fractions of 1,500 – 1,800 ml. are collected. These fractions are assayed for deaminase inhibitor content and the fractions containing the majority of the desired product are combined (6200 ml.) (four fractions). The latter pool is concentrated in vacuo while maintaining the pH at 8.2 – 8.5, and then lyophilized to give 14.7 g. of solid. The residue is dissolved in 100 ml. of water, the pH of the solution is adjusted from 7.9 to 8.5, and the material is charged onto a Sephadex G-10 column prepared in water (5.1 cm × 115 cm; $V_o$ 800 ml., $V_i$ 1200 ml.). Once the feed has percolated through the column at the rate of 320 ml/hr., the column is developed with water. The $V_i$ ml/hr., fractions were collected in 100 ml. fractions. According to the deaminase assay, the desired material is obtained in the fractions at the tail end of the $V_i$ and beyond; these are lyophilized. One lyophilized fraction containing 1.40 g. of solids is dissolved in 5.5 ml. of cold methanol and the solution is chilled overnight at 5°C. The resulting crystals are filtered off, washed with cold methanol and recrystallized from 10 ml. of methanol and 0.6 ml. of water.

Yield of crystals: 215 mg.; m.p. 220°– 225°C uncorrected.

Enzymatic determination of (R)-3-(2-deoxy-β-D-erythro-pentofuranosyl)-3,6,7,8-tetrahydroimidazo[4,5-d]-[1,3]diazepin-8-ol by calculation of the degree of deaminase inhibition.

Procedure: 1 ml. of aqueous 9-(β-D-arabinofuranosyl)adenine solution at 300 µg/ml. is diluted with 8 ml. of 0.05 M phosphate buffer pH 7.5; to this solution is added 1 ml. of test solution containing various amounts of (R)-3-(2-deoxy-β-D-erythro-pentofuranosyl)-3,6,7,8-tetrahydroimidazo[4,5-d]-[1,3]diazepin-8-ol. A 3 ml. aliquot of the above solution is added to a quartz U.V. cell and the density measured at 265 mµ; 0.1 ml. of adenosine deaminase enzyme solution at 1 µg/ml. (type 1: [pfs] frm intestinal mucosa; Sigma Chemical Company, St. Louis, Mo.) is added to the cell, the solution is mixed, and the U.V. density at 265 mµ determined 5 minutes later.

| µg of Crystalline Deaminase Inhibitor per ml. | O.D. at λ 265 | | Drop in O.D. |
|---|---|---|---|
| | O Time | 5 Min. | |
| Control | 1.433 | 1.046 | .387 |
| 0.1 | 1.432 | 1.365 | .067 |
| 0.075 | 1.432 | 1.355 | .077 |
| 0.05 | 1.441 | 1.355 | .086 |
| 0.04 | 1.439 | 1.347 | .092 |
| 0.03 | 1.429 | 1.315 | .114 |
| 0.02 | 1.438 | 1.291 | .148 |
| 0.01 | 1.435 | 1.225 | .210 |

For the determination of quantities of (R)-3-(2-deoxy-β-D-erythro-pentofuranosyl)-3,6,7,8-tetrahydroimidazo-[4,5-d][1,3]diazepin-8-ol present in test solution, a drop of 0.10 in the U.V. at 265 nm is equal to ca. 0.035 µg of (R)-3-(2-deoxy-β-D-erythro-pentofuranosyl)-3,6,7,8-tetrahydroimidazo[4,5-d][1,3]diazepin-8-ol.

B. Pilot Plant Purification

The remaining 23.7 liters of concentrate obtained from the carbon batch adsorption step (feed A) mentioned previously is diluted with 31.6 liters of water and 2.9 liters of acetone to give a 5% aqueous acetone solution (58.2 liters) and the final solution is used as the charge for a prepared column of Darco G-60, 18 in. wide × 12 ft. high. The column is prepared as follows: 180 lbs. of Darco G-60 and 180 lbs. of Celite No. 545 are slurried in 150 gals. of 5% aqueous acetone, the pH of the mixture is adjusted to 9 with 480 ml. of 10 N sodium hydroxide, the slurry is packed into the 18 in. column, and the column brought to head. The 58.2 liters of feed is loaded into the column and then the column is developed with 5% aqueous acetone. The column is pressurized at 10 lbs./in.² — flow rate 450 ml./min. The column is washed with 115 gallons of 5% aqueous acetone percolate and 60 gals. of 10% aqueous acetone. The deaminase inhibitor is eluted with 25% aqueous acetone and fractions of 18 liters are collected and assayed for deaminase inhibitor activity. Solids are also determined on each fraction by the lyphilization of 25 ml. aliquots. Nine fractions comprising a total of about 162 liters, which contains the deaminase inhibitor, are combined and concentrated in vacuo at less than 35°C to a final volume of 2.7 liters, while the pH is maintained at 9.0; the total quantity of solids obtained in the concentrate is about 467 g.

The above concentrate (2.7 liters) is then fractionated on a column of Sephadex G-10 (Pharmacia Co., Piscataway, N.J.). The Sephadex (6 kg.), which is a cross linked dextran, is swollen in water for 2 days, packed into a 4 in. glass column, and then washed with water until a negative carbohydrate test (phenol and sulfuric acid) is obtained. The characteristics of the packed column are as follows: Size of packed column 4 in. × 74 in.; $V_o$ 5.2 liters; flow rate 2.1 liters/hr., feed for column is about 600 ml. of the 2.7 liter of carbon column concentrate. Once the feed has percolated through the Sephadex G-10, the column is developed with water; the $V_i$ is collected in 400 ml. fractions, and the fractions containing the majority of the (R)-3-(2-deoxy-β-D-erythro-pentofuranosyl)-3,6,7,8-tetrahydroimidazo[4,5-d][1,3]diazepin-8-ol are combined, concentrated in vacuo, and lyophilized. The above Sephadex column is used an additional three times to fractionate the remainder of the carbon column concentrate. The combined fractions containing the (R)-3-(2-deoxy-β-D-erythro-pentofuranosyl)-3,6,7,8-tetrahydroimidazo[4,5-d][1,3]diazepin-8-ol from each of the four Sephadex columns are pooled and crystallized from 90% aqueous methanol. The crystals were recrystallized three times to give 8.5 g. of crystalline (R)-3-(2-deoxy-β-D-erythro-pentofuranosyl)-3,6,7,8-tetrahydroimidazo[4,5-d]-[1,3]diazepin-8-ol.

EXAMPLE 2

PHARMACEUTICAL COMPOSITIONS

1) Parenteral Preparation

| Ingredient | Content (mg/ml) |
| --- | --- |
| 9-(β-D-arabinofuranosyl)adenine hydrate | 200 |
| (R)-3-(2-deoxy-β-D-erythro-pentofuranosyl)-3,6,7,8-tetrahydroimidazo[4,5-d][1,3]-diazepin-8-ol | 10 |
| Phemerol chloride | 0.1 |
| Sodium phosphate monobasic | 4.8 |
| Sodium phosphate dibasic | 1.11 | a. Dissolve the phemerol chloride, sodium phosphate monobasic, and the sodium phosphate dibasic in an appropriate quantity of Water for Injection U.S.P.
b. Sterilize the solution prepared in step (a) by passage through a 0.22 μ membrane filter.
c. Incorporate the sterile 9-(β-D-arabinofuranosyl)adenine hydrate and the (R)-3-(2-deoxy-β-D-erythro-pentofuranosyl)-3,6,7,8-tetrahydroimidazo[4,5-d][1,3]diazepin-8-ol into the sterile solution from step b. Adjust the volume to the appropriate quantity with sterile Water for Injection U.S.P. Mix until a homogeneous suspension results.
d. Fill each bottle with the appropriate volume of suspension from step (c) to result in the proper content of listed ingredients.
e. Freeze the filled bottles from step (d) by placing at −40°C or a lower temperature for a minimum of 12 hours.
f. Lyophilize the frozen preparation as follows:
 1. Pre-cool dryer shelves to −45°C.
 2. Load frozen product into dryer.
 3. Draw a vacuum of 100 μm or less in the dryer chamber.
 4. Apply shelf-heat to reach a maximum of +40°C at the end of a 48 hour period.
 5. Release the vacuum with sterile filtered dry nitrogen gas.
 6. Cap the dry bottles with appropriate closures.
g. The appropriate intravenous fluid is added to the lyophilized sterile solid prior to using.

2) Ophthalmic Preparations
a) Ophthalmic Ointment

| Ingredient | Content (Wt./gm Ointment) | |
| --- | --- | --- |
| Sterile, finely divided** 9-(β-D-arabinofuranosyl)adenine hydrate | 30 | mg |
| Sterile, finely divided** (R)-3-(2-deoxy-β-D-erythro-pentofuranosyl)-3,6,7,8-tetrahydroimidazo[4,5-d][1,3]diazepin-8-ol | 1.5 | mg |
| Sterile ointment base qs ad | 1.000 | gm |

1. Aseptically incorporate both the sterile, finely divided 9-(β-D-arabinofuranosyl)adenine hydrate and the sterile, finely divided (R)-3-(2-deoxy-β-D-erythro-pentofuranosyl)-3,6,7,8-tetrahydroimidazo[4,5-d][1,3]diazepin-8-ol in a small portion of the sterile ointment base by levigation to form a smooth paste.
2. Gradually incorporate the sterile concentrated paste formed in step No. 1 aseptically with the remainder of the sterile ointment base by use of a suitable sterile mixer.
3. Aseptically pass the completed mixture from step No. 2 through a suitable sterile ointment mill to insure a homogenous preparation.

**Average particle size near 2.4 μ.

b) Ophthalmic Drops

| Ingredient | Content (Wt/ml) | |
| --- | --- | --- |
| Sterile, finely divided** 9-(β-D-arabinofuranosyl)adenine hydrate | 30 | mg |
| (R)-3-(2-deoxy-β-D-erythro-pentofuranosyl)-3,6,7,8-tetrahydroimidazo[4,5-d][1,3]diazepin-8-ol | 1.5 | mg |
| Sodium chloride | 9.0 | mg |
| Polyvinylpyrollidone | 30.0 | mg |
| Phemerol chloride (benzethonium chloride) | 0.1 | mg |
| Water for injection qs ad | 1.0 | ml |

1. Dissolve the sodium chloride, polyvinylpyrollidone and the phemerol chloride in a portion of the Water for Injection. Sterilize the solution by filtration through a 0.22 μ Millipore membrane.
2. Aseptically incorporate the sterile, finely divided 9-(β-D-arabinofuranosyl)adenine hydrate and sterile, finely divided (R)-3-(2-deoxy-β-D-erythropentofuranosyl)-3,6,7,8-tetrahydroimidazo[4,5-d]-[1,3]diazepin-8-ol into the vehicle from step No. 1.

3. Add sufficient sterile Water for Injection to the mixture from step No. 2 to make the required volume. Mix thoroughly to form a homogenous suspension.

**Average particle size near 2.4 μ.

3) Topical Preparation

| Ingredient | Content (Wt/gm Cream) |
|---|---|
| 9-(β-D-arabinofuranosyl)adenine hydrate** | 30 mg |
| (R)-3-(2-deoxy-β-D-erythro-pentofuranosyl)--3,6,7,8-tetrahydroimidazo[4,5-d][1,3]-diazepin-8-ol | 1.5 mg |
| Stearyl alcohol U.S.P. | 250.0 mg |
| Petrolatum U.S.P. white | 200.0 mg |
| Myrj 52 | 50.0 mg |
| Propylene glycol | 120.0 mg |
| Distilled water | 349.0 mg |
| Distilled water qs ad | 1000.0 mg | a. Mix the distilled water and propylene glycol and heat to 75°C.

b. Mix the stearyl alcohol U.S.P., petrolatum U.S.P. white and Myrj 52 and melt by heating to 75°C.

c. The aqueous phase (step a) must be slowly added to the oil phase (step b) with rapid stirring.

d. When the preparation cools to 50°– 55°C incorporate the 9-(β-D-arabinofuranosyl)adenine hydrate and the (R)-3-(2-deoxy-β-D-erythro-pentofuranosyl)-3,6,7,8-tetrahydroimidazo[4,5-d][1,3]diazepin-8-ol. Continue to stir the mixture until it is cool and congeals.

**Average particle size near 2.4 μ.

I claim:

1. An essentially pure compound having the name (R)-3-(2-deoxy-β-D-erythro-pentofuranosyl)-3,6,7,8-tetrahydroimidazo[4,5-d][1,3]diazepin-8-ol.

2. A mixture consisting of the compound of claim 1 and 9-(β-D-arabinofuranosyl)adenine.

3. The mixture of claim 2 wherein the ratio of (R)-3-(2-deoxy-β-D-erythro-pentofuranosyl)-3,6,7,8-tetrahydroimidazo[4,5-d][1,3]diazepin-8-ol to 9-(β-D-arabinofuranosyl)adenine is from about 0.005 to 0.2:1.

* * * * *